US012786054B2

(12) United States Patent
Iturria et al.

(10) Patent No.: US 12,786,054 B2
(45) Date of Patent: Nov. 3, 2026

(54) SYSTEM AND METHOD FOR AUTOMATIC ADJUSTMENT OF NETWORK DEVICE CONFIGURATIONS

(71) Applicant: BANK OF AMERICA CORPORATION, Charlotte, NC (US)

(72) Inventors: Jose Iturria, Astoria, NY (US); Amit Beniwal, Jacksonville, FL (US); Ramesh Babu Chandanala, Concord, NC (US); Mark E. Fowler, Allen, TX (US); Arjun Thimmareddy, Charlotte, NC (US); Basantkumar Tiwari, Edison, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 41 days.

(21) Appl. No.: 18/894,928

(22) Filed: Sep. 24, 2024

(65) Prior Publication Data

US 2026/0089054 A1 Mar. 26, 2026

(51) Int. Cl.
*H04L 41/0806* (2022.01)
*H04L 41/16* (2022.01)

(52) U.S. Cl.
CPC .......... *H04L 41/0806* (2013.01); *H04L 41/16* (2013.01)

(58) Field of Classification Search
CPC ............... H04L 41/084; H04L 41/0846; H04L 41/0843; H04L 41/0813; H04L 41/0816; H04L 41/082; H04L 41/0806; H04L 41/0809; H04L 41/0803; H04L 41/08; H04L 41/085
See application file for complete search history.

(56) References Cited

U.S. PATENT DOCUMENTS

| | | | | |
|---|---|---|---|---|
| 7,543,058 | B1 | 6/2009 | Ayachitula | |
| 9,172,607 | B2 | 10/2015 | Dawson | |
| 9,575,739 | B2 | 2/2017 | Bhattiprolu | |
| 10,419,282 | B1 * | 9/2019 | Cosgrove | H04L 41/0886 |
| 10,644,980 | B2 | 5/2020 | Lyons | |
| 10,805,153 | B2 * | 10/2020 | Wang | H04L 41/0843 |
| 11,216,272 | B1 | 1/2022 | Lake | |
| 11,228,617 | B2 | 1/2022 | Raleigh | |
| 11,477,108 | B2 | 10/2022 | Chow | |
| 11,575,605 | B2 | 2/2023 | Rovner | |

(Continued)

*Primary Examiner* — Rachel J Hackenberg
(74) *Attorney, Agent, or Firm* — Moore & Van Allen PLLC; Nicholas C. Russell

(57) ABSTRACT

Systems, computer program products, and methods are described herein for automatic adjustment of network device configurations. The present disclosure is configured to receive a network device comprising a set of adjustable settings configured to adapt to a network assembly, wherein the network assembly comprises a plurality of network devices, wherein the set of adjustable settings within the network device can be adjusted to the network assembly and components within the network assembly; designate a function of the network device with respect to the network assembly; match the function of the network device with a model configuration plan associated with the network assembly via a machine learning model (MLM); configure the set of adjustable settings within the network device using the model configuration plan via the MLM to operably connect with the plurality of network devices within the network assembly.

14 Claims, 5 Drawing Sheets

(56) References Cited

U.S. PATENT DOCUMENTS

| | | | | |
|---|---|---|---|---|
| 2019/0356538 | A1* | 11/2019 | Stanciu | H04L 41/0843 |
| 2023/0102397 | A1* | 3/2023 | Atri | H04L 41/0843 709/221 |
| 2024/0354181 | A1* | 10/2024 | Sathyanarayana | G06F 11/004 |

* cited by examiner

SYSTEM AND METHOD FOR AUTOMATIC ADJUSTMENT OF NETWORK DEVICE CONFIGURATIONS

TECHNOLOGICAL FIELD

Example embodiments of the present disclosure relate to automatic adjustment of network device configurations.

BACKGROUND

Installation of a new device within a network assembly may utilize a plurality of technicians and engineers to integrate within the assembly. Installation may further allocate time and resources away from the overall assembly to focus on the new device.

Applicant has identified a number of deficiencies and problems associated with automatic adjustment of network device configurations. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for automatic adjustment of network device configurations. In one aspect, a system for automatic adjustment of network device configurations is presented. The system including a processing device, at least one non-transitory storage device, and at least one processing device coupled to the at least one non-transitory storage device wherein the at least one processing device may be configured to: receive a network device comprising a set of adjustable settings configured to adapt to a network assembly, wherein the network assembly comprises a plurality of network devices, wherein the set of adjustable settings within the network device can be adjusted to the network assembly and components within the network assembly; designate a function of the network device with respect to the network assembly; match the function of the network device with a model configuration plan associated with the network assembly via a machine learning model (MLM); configure the set of adjustable settings within the network device using the model configuration plan via the MLM to operably connect with the plurality of network devices within the network assembly.

In some embodiments, the network device comprises a router.

In some embodiments, the network device comprises a switch.

In some embodiments, the MLM matches the function of the network device with the model configuration plan using a k-nearest neighbor data labeling technique.

In some embodiments, the MLM matches the function of the network device with the model configuration plan using a random forest technique.

In some embodiments, the model configuration plan is adjusted based on the plurality of network devices within the network assembly.

In some embodiments, the model configuration plan comprises guidelines for the adjustable settings of the network device.

In another aspect, a computer program product for automatic adjustment of network device configurations is presented. The computer program product comprising at least one non-transitory computer-readable medium having computer-readable program code portions embodied therein, the computer-readable program code portions which when executed by a processing device are configured to cause the processor to perform the following operations: receive a network device comprising a set of adjustable settings configured to adapt to a network assembly, wherein the network assembly comprises a plurality of network devices, wherein the set of adjustable settings within the network device can be adjusted to the network assembly and components within the network assembly; designate a function of the network device with respect to the network assembly; match the function of the network device with a model configuration plan associated with the network assembly via a machine learning model (MLM); configure the set of adjustable settings within the network device using the model configuration plan via the MLM to operably connect with the plurality of network devices within the network assembly.

In some embodiments, the network device comprises a router.

In some embodiments, the network device comprises a switch.

In some embodiments, the MLM matches the function of the network device with the model configuration plan using a k-nearest neighbor data labeling technique.

In some embodiments, the MLM matches the function of the network device with the model configuration plan using a random forest technique.

In some embodiments, the model configuration plan is adjusted based on the plurality of network devices within the network assembly.

In some embodiments, the model configuration plan comprises guidelines for the adjustable settings of the network device.

In another aspect, a computer-implemented method for automatic adjustment of network device configurations is presented. The computer-implemented method may include: receiving a network device comprising a set of adjustable settings configured to adapt to a network assembly, wherein the network assembly comprises a plurality of network devices, wherein the set of adjustable settings within the network device can be adjusted to the network assembly and components within the network assembly; designating a function of the network device with respect to the network assembly; matching the function of the network device with a model configuration plan associated with the network assembly via a machine learning model (MLM); configuring the set of adjustable settings within the network device using the model configuration plan via the MLM to operably connect with the plurality of network devices within the network assembly.

In some embodiments, the network device comprises a router.

In some embodiments, the network device comprises a switch.

In some embodiments, the MLM matches the function of the network device with the model configuration plan using a k-nearest neighbor data labeling technique.

In some embodiments, the MLM matches the function of the network device with the model configuration plan using a random forest technique.

In some embodiments, the model configuration plan is adjusted based on the plurality of network devices within the network assembly.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
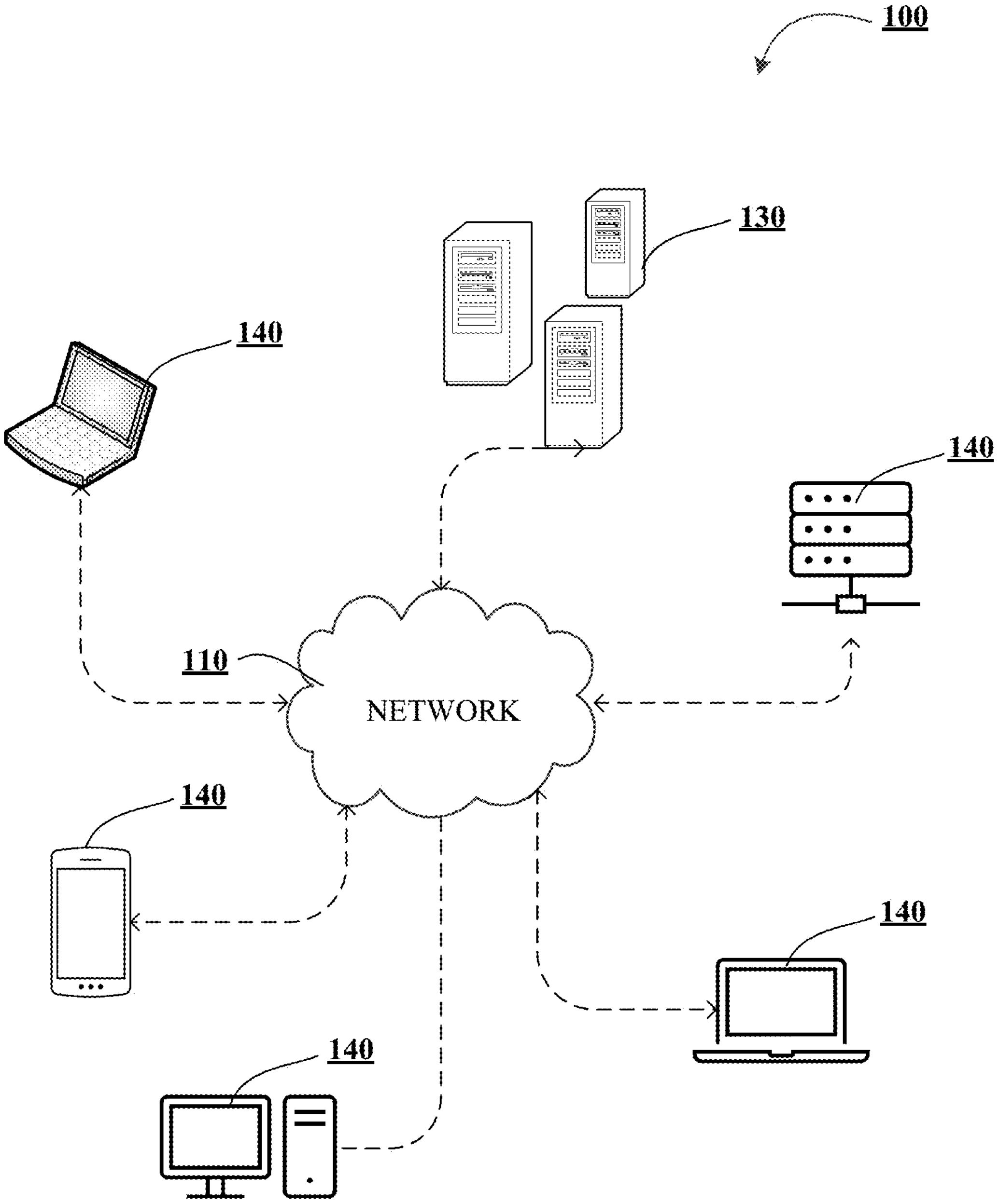
Figure 1B:
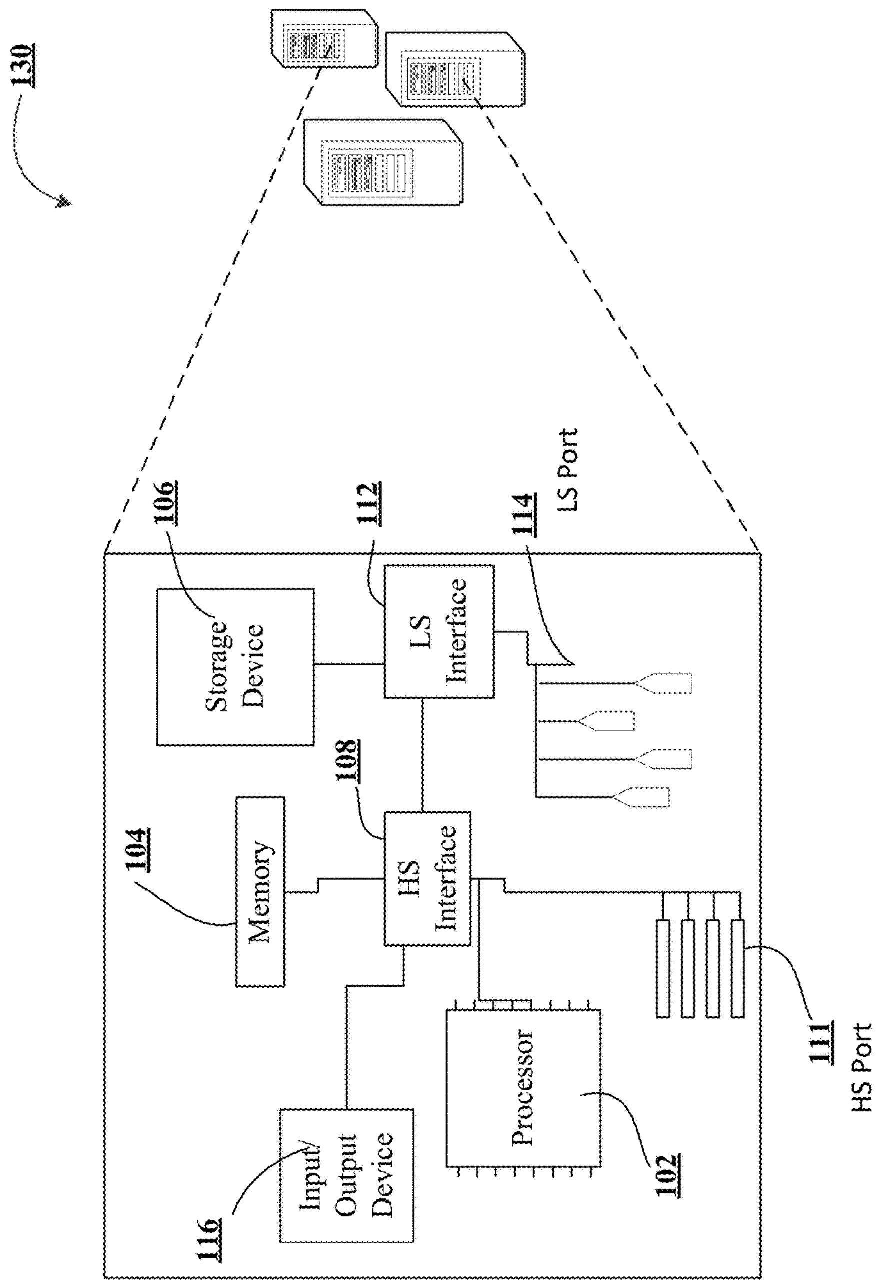
Figure 1C:
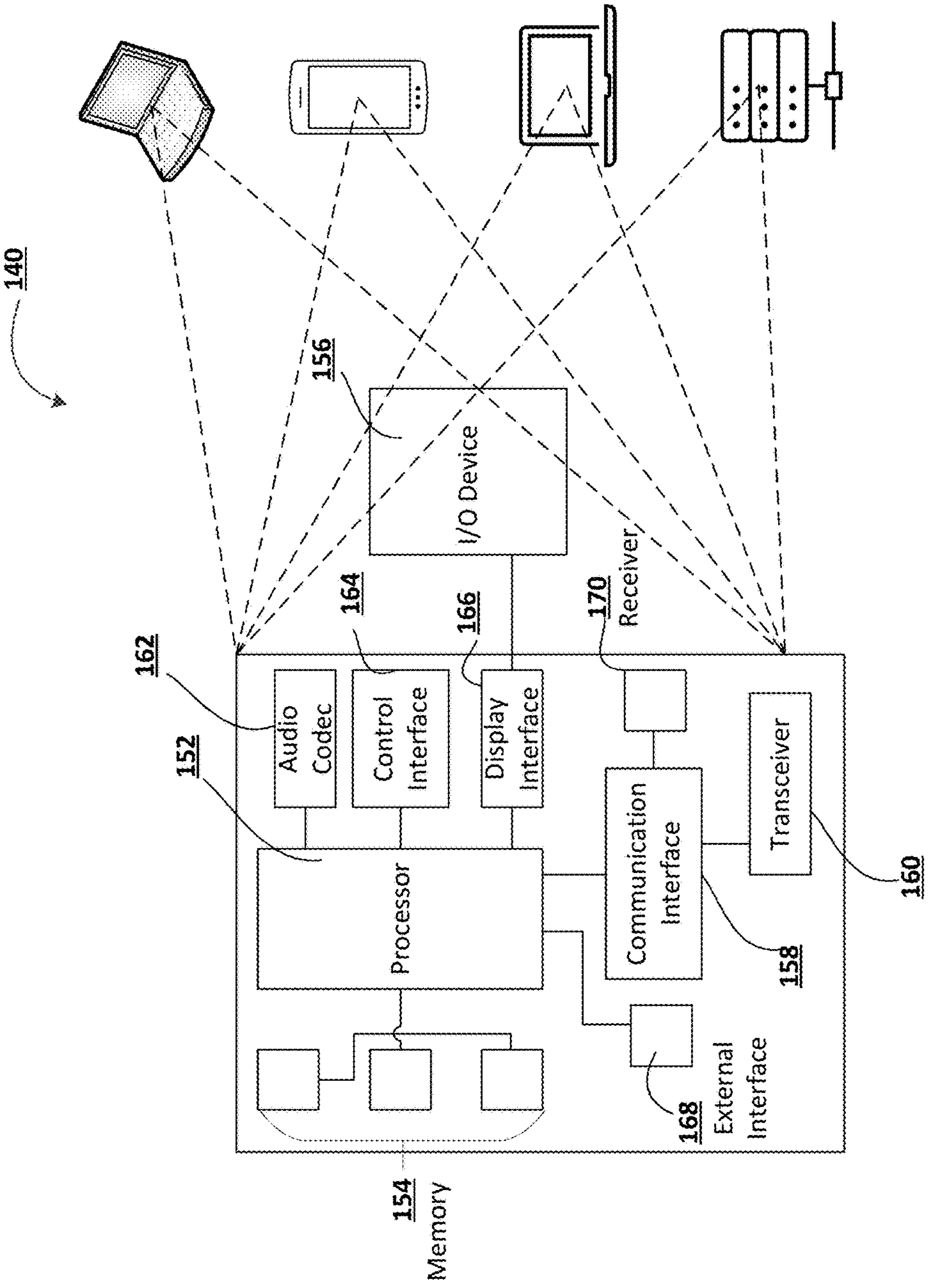
Figure 2:
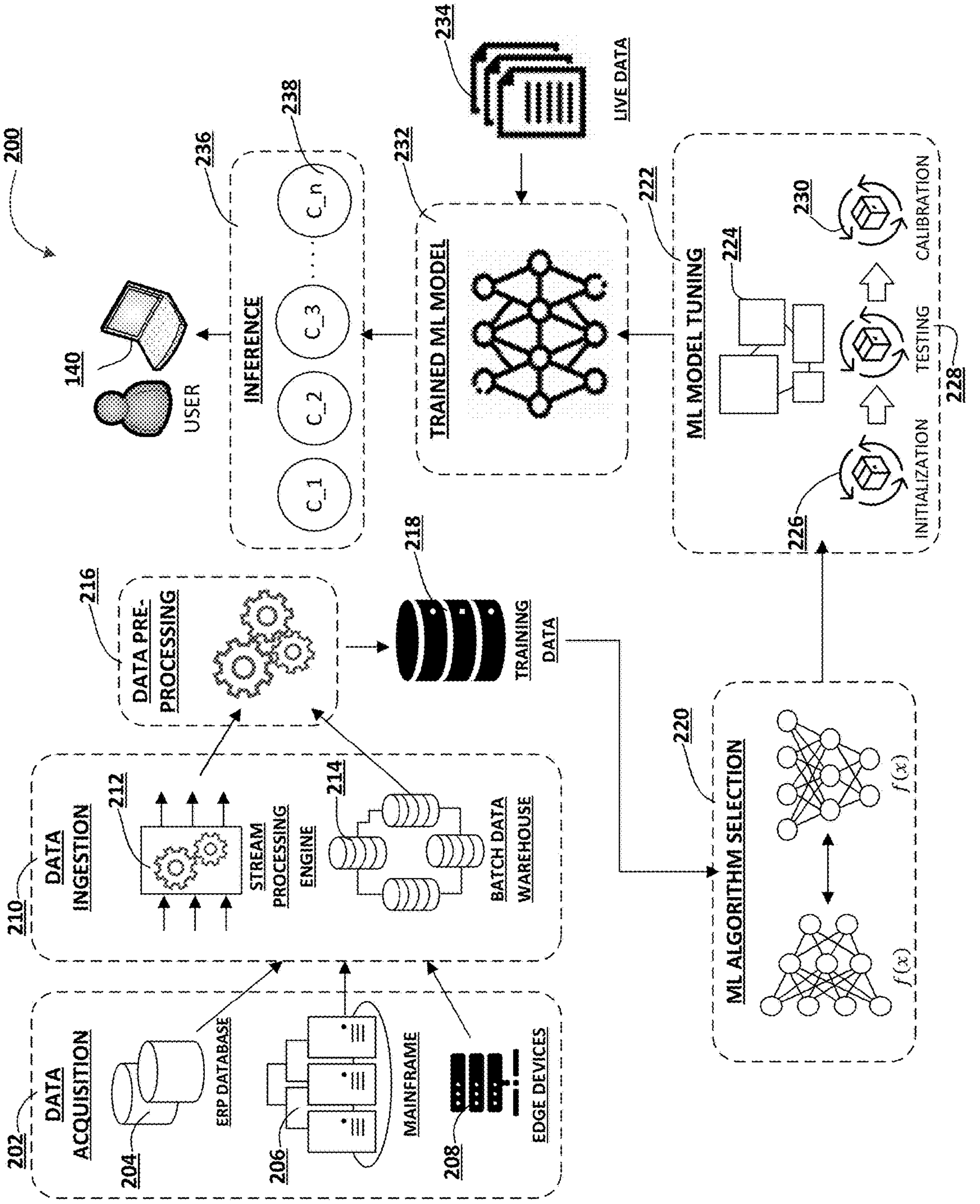
Figure 3:
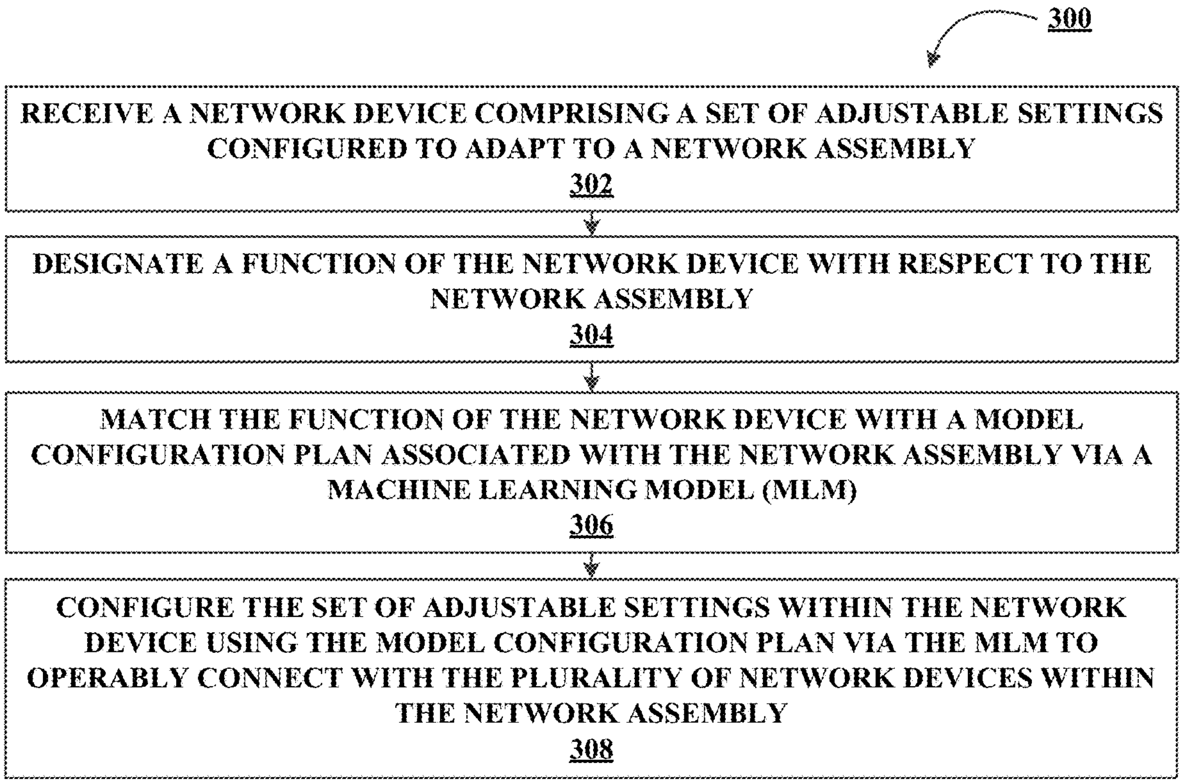

FIGS. 1A-1C illustrates technical components of an exemplary distributed computing environment for automatic adjustment of network device configurations, in accordance with an embodiment of the disclosure;

FIG. 2 illustrates an exemplary machine learning (ML) subsystem architecture, in accordance with an embodiment of the disclosure; and FIG. 3 illustrates a process flow for systems and methods for automatic adjustment of network device configurations, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As networks and network infrastructure continue to expand in size and complexity, the integration and calibration of a network device into the network assembly may become more difficult and time consuming. The plurality of network devices within the network assembly may be integrated to communicate, interact, and operably engage with other network devices within the network assembly. As the network assembly expands, onboarding and preparing new network devices into the network assembly may increase in importance and difficulty in creating and managing connections to other network devices within the assembly.

As a new network device is added to a network assembly, personnel including multiple technicians and engineers may alter multiple settings within the network device to onboard and configure the network device. The personnel that adjust and configure the network device may calibrate and configure multiple settings within the network device to successfully integrate the device into the network assembly. The onboarding and adjustment by personnel may cause mass expenditures in time and resources. Network devices that match previously installed network devices may be burdensome, as the settings and configurations for a previous network device may have already been calibrated. This may cause redundancy in addition to expending time and resources.

Automatic configuration of a network device may be implemented using machine learning models and stored configurations of previously installed network devices. Machine learning models may be used in place of multiple teams to adjust settings of the new device and set up the network device using pre-stored configurations of previously added network devices. For instance, a router or switch added to a network assembly that matches the function and configurations of a previously installed router or switch may be matched using the machine learning model, and subsequently adjusting/configuring the network device to integrate with the overall network assembly.

Accordingly, the present disclosure describes the automatic adjustment and calibration of new network devices (e.g., a switch or a router) added to a network assembly (e.g., a datacenter). Wherein a previously added network device may be onboarded, configured, and maintained by a plurality of engineers and managers, machine learning models may instead designate, match, and configure the network device within the overall network assembly. A function of the received network device may be designated in the context of the network assembly. The function of the network device may then be matched with a model configuration plan associated with the network assembly via a machine learning model (MLM). After designating a function for the network device within the network assembly and matching the function to a model configuration plan, the network device may be configured to integrate the network device within the network assembly. Integration of the network device may include adjusting/changing the set of adjustable settings within the network device to match the model configuration plan. The MLM may utilize a k-nearest neighbor data labeling technique or a random forest technique to match the network device with a model configuration plan.

What is more, the present disclosure provides a technical solution to a technical problem. As described herein, the technical problem includes the installation of network devices within a network assembly. The technical solution presented herein allows for automatic adjustment of network device configurations. In particular, automatic adjustment of network device configurations is an improvement over existing solutions to the manual adjustment of network device configurations, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for automatic adjustment of network device configurations 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and /r combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2. . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2. . . C_n 238) live data 234 based on how similar they are to one another to solve exploratory challenges where little is known about the data, provide a description or label (e.g., C_1, C_2. . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for systems and methods of generating a baseline mode of operation from network and application logs. In some embodiments, a system (e.g., similar to one or more of the systems described herein with respect to FIGS. 1A-1C) may perform one or more of the steps of process flow 300. In some embodiments, a generative artificial intelligence engine (e.g., the generative AI engine shown in FIG. 2) may perform some or all the steps described in process flow 300.

As shown in Block 302, the process flow 300 may include the step of receiving a network device comprising a set of adjustable settings configured to adapt to a network assembly. The network device may comprise hardware components that may connect and/or manage network resources, components, and/or operations. The network device may operably connect and integrate with multiple network devices within the network assembly. Connections between the network device and network devices within the network assembly may be configured to connect to future network devices added within the network assembly. The network device may be configured to adjust and adapt to settings within the network assembly, including but not limited to internet protocol (IP) address configuration, routing protocols, virtual local area network (VLAN) configuration, security setting (e.g., access control lists, port security, firewall rules), quality of service settings (e.g., traffic prioritization, bandwidth management, port address translation), spanning tree protocol settings, time synchronization, firmware updates, software updates, authentication and authorization, and/or dynamic host configuration protocols (DHCP). Adjustable settings within the network device may be adjusted based on the type and nature of the network device installed within the network assembly.

In some embodiments, the network device may comprise a switch. The network device embodied as a switch may include but may not limited to a managed switch, semi-managed switch, power over ethernet switch, layer two switch, multilayer switch, stackable switch, chassis switch, industrial switch, core switch, distribution switch, and/or access switch. Switches embodied as the network device may operably engage connect, and function within the network assembly, and may form at least partial connections to other network devices within the assembly.

In some embodiments, the network device may comprise a router. The network device embodied as a router may include but not be limited to a core router, edge router, wireless router, virtual router, broadband router, distribution router, industrial router, modular router, core-edge router, and/or a combination of such. Routers acting as the network device may operably engage, connect, and function within the network assembly, and may form at least partial connections to other network devices within the assembly.

The network assembly may comprise a plurality of network devices that may be operably connected within the assembly. The network assembly may further be configured to connect and operably engage with a network and a set of network adjacent devices. The received network device may be added, integrated and/or operably connected to the network assembly and the corresponding network devices within the assembly. Configuration of the set of adjustable settings within the network assembly may, in some instances, adjust the set of settings and configurations within the plurality of network devices. For instance, the network assembly may have routing protocols updated, which may in turn update and reconfigure the plurality of network devices within the network assembly.

As shown in Block 304, the process flow 300 may include the step of designating a function of the network device with respect to the network assembly. Designation of a function of a network device may label, group, and/or identify the function of the network device within the network assembly. In some embodiments, the network device may have a function designated through an inputted command (e.g., the network device is labeled as performing a function using settings prestored within the network assembly). In some embodiments, designation of the function of the network device may be conducted via a machine learning model (MLM) as described in greater detail below. For instance, a received network device may be designated as a core router within the network assembly. The designation of the network device as a core router may indicate the settings and configurations for the network device. The function designated to the network device may then be matched with a model configuration plan, as described in greater detail below.

Functions of the network device may determine the configuration, predetermined settings, and setup guidelines for the network device within the network assembly. For instance, a router added to the network assembly may be designated with a function of a core router may subsequently be configured to match configurations, predetermined settings, and setup guidelines associated with core routers previously within the network assembly. In other words, the function of the network device may be the purpose or directive of the network device, and the set up for a similar network device previously added to the network assembly may be used as a model to configure and set up the new network device. Functions of the device may be designated from the type of network device received, as well as technical capabilities and adjustable settings within the network device.

As shown in Block 306, the process flow 300 may include the step of matching the function of the network device with a model configuration plan associated with the network assembly via a machine learning model (MLM). The model configuration plan associated with the network assembly may comprise settings, configurations, and/or alterations to a network device to align a network device with the network assembly. In other words, the model configuration plan may be a "blueprint" or "map" that highlights the set of adjustable settings and configurations within the network device that may be adjusted to adapt to the network assembly. Matching the function of the network device with the model configuration plan may be conducted by the MLM based on the function of the network device and the model configuration plan. The MLM may be a form of machine learning as previously described in FIG. 2.

In some embodiments, the MLM may match the function of the network device with the model configuration plan using a k-nearest neighbor (K-NN) data labeling technique. The K-NN data labeling technique may comprise a non-parametric method for labeling data points based on approximation and proximity to labeled data points within a dataset. For instance, a network device added to the network assembly may be matched with a model configuration plan based on the adjustable settings within the network device. The K-NN data labeling technique may be used by or in conjunction with the machine learning models and methods previously described in FIG. 2. In some embodiments, the K-NN data labeling may be utilized based on the network device added to the network assembly and the set of adjustable settings within the network device.

In some embodiments, the MLM may match the function of the network device with the model configuration plan using a random forest technique. The random forest technique may comprise a machine learning method as described in FIG. 2. The random forest technique may comprise a plurality of decision trees, which may be merged to obtain a label or title based on the received data point. The random forest technique may be used by or in conjunction with the machine learning models and methods previously described in FIG. 2. In some embodiments, random forest technique may be utilized based on the network device added to the network assembly and the set of adjustable settings within the network device.

As shown in Block 308, the process flow 300 may include the step of configuring the set of adjustable settings within the network device using the model configuration plan via the MLM to operably connect with the plurality of network devices within the network assembly. Configuring the set of adjustable settings within the network device using the model configuration plan may be based on the function of the network device. For instance, if the function designated to the network device matches the model configuration plan for a router within the network assembly, the set of adjustable settings within the network device may be configured to match the routing protocols of the model configuration. The set of adjustable settings within the network device may be configured, adjusted, and/or routed to match the model configuration plan. In other words, the added network device may be calibrated the same as previously added network devices if they have the same model configuration plans (e.g., a new router matches a previously added router within the network assembly).

In some embodiments, the model configuration plan may be adjusted based on connected network devices within the network assembly. For instance, the model configuration plan may be adaptable based on operably connected network devices (e.g., the number of switches connected to a router). The model configuration plan may have the set of adjustable settings configured to change based on the contents and functions of the network assembly. Further, the model configuration plan may direct the set of adjustable settings within the network device to adjust based on the number, complexity, connections, and overall layout of the network assembly. For instance, a subset of the adjustable settings of the network device may be changed if the network device is connected to a single router as opposed to a router and multiple switches.

In some embodiments, the model configuration plan comprises guidelines for the adjustable settings of the network device. Guidelines for the adjustable settings of the network device may be measures, rules, standards, and/or baselines for which the network device may be calibrated. For instance, a network device (e.g., a router) added to the network assembly may adopt the same access control lists, bandwidth management, and traffic prioritization as a previously added router within the network assembly.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automatic adjustment of network device configurations, the system comprising:

a processing device;

at least one non-transitory storage device; and at least one processing device coupled to the at least one non-transitory storage device, wherein the at least one processing device is configured to:

receive a network device comprising a set of adjustable settings configured to adapt to a network assembly, wherein the network assembly comprises a plurality of network devices, wherein the set of adjustable settings within the network device can be adjusted to the network assembly and components within the network assembly;

designate a function of the network device with respect to the network assembly;

match the function of the network device with a model configuration plan associated with the network assembly via a machine learning model (MLM) using k-nearest neighbor data labeling in conjunction with a random forest technique, wherein the k-nearest neighbor data labeling comprises a non-parametric method for labeling a received data point based on approximation and proximity to labeled data points within a dataset and wherein the random forest technique comprises a plurality of decision trees merging to obtain a label based on the received data point; and configure the set of adjustable settings within the network device using the model configuration plan via the MLM to operably connect with the plurality of network devices within the network assembly.

2. The system of claim 1, wherein the network device comprises a router.

3. The system of claim 1, wherein the network device comprises a switch.

4. The system of claim 1, wherein the model configuration plan is adjusted based on the plurality of network devices within the network assembly.

5. The system of claim 1, wherein the model configuration plan comprises guidelines for the adjustable settings of the network device.

6. A computer program product for automatic adjustment of network device configurations, the computer program product comprising at least one non-transitory computer-readable medium having computer-readable program code portions embodied therein, the computer-readable program code portions which when executed by a processing device are configured to cause a processor to perform the following operations:

receive a network device comprising a set of adjustable settings configured to adapt to a network assembly, wherein the network assembly comprises a plurality of network devices, wherein the set of adjustable settings within the network device can be adjusted to the network assembly and components within the network assembly;

designate a function of the network device with respect to the network assembly;

match the function of the network device with a model configuration plan associated with the network assembly via a machine learning model (MLM) using k-nearest neighbor data labeling in conjunction with a random forest technique, wherein the k-nearest neighbor data labeling comprises a non-parametric method for labeling a received data point based on approximation and proximity to labeled data points within a dataset and wherein the random forest technique comprises a plurality of decision trees merging to obtain a label based on the received data point; and configure the set of adjustable settings within the network device using the model configuration plan via the MLM to operably connect with the plurality of network devices within the network assembly.

7. The computer program product of claim 6, wherein the network device comprises a router.

8. The computer program product of claim 6, wherein the network device comprises a switch.

9. The computer program product of claim 6, wherein the model configuration plan is adjusted based on the plurality of network devices within the network assembly.

10. The computer program product of claim 6, wherein the model configuration plan comprises guidelines for the adjustable settings of the network device.

11. A computer-implemented method for automatic adjustment of network device configurations, the computer-implemented method comprising:

receiving a network device comprising a set of adjustable settings configured to adapt to a network assembly, wherein the network assembly comprises a plurality of network devices, wherein the set of adjustable settings within the network device can be adjusted to the network assembly and components within the network assembly;

designate a function of the network device with respect to the network assembly;

match the function of the network device with a model configuration plan associated with the network assembly via a machine learning model (MLM) using k-nearest neighbor data labeling in conjunction with a random forest technique, wherein the k-nearest neighbor data labeling comprises a non-parametric method for labeling a received data point based on approximation and proximity to labeled data points within a dataset and wherein the random forest technique comprises a plurality of decision trees merging to obtain a label based on the received data point; and configure the set of adjustable settings within the network device using the model configuration plan via the MLM to operably connect with the plurality of network devices within the network assembly.

12. The computer-implemented method of claim 11, wherein the network device comprises a router.

13. The computer-implemented method of claim 11, wherein the network device comprises a switch.

14. The computer-implemented method of claim 11, wherein the model configuration plan is adjusted based on the plurality of network devices within the network assembly.

* * * * *